(12) United States Patent
Lebda et al.

(10) Patent No.: US 6,385,594 B1
(45) Date of Patent: May 7, 2002

(54) METHOD AND COMPUTER NETWORK FOR CO-ORDINATING A LOAN OVER THE INTERNET

(75) Inventors: Douglas Lebda, Charlotte; Richard Stiegler, Weddington, both of NC (US)

(73) Assignee: LendingTree, Inc., Charlotte, NC (US)

( * ) Notice: Subject to any disclaimer, the term of this patent is extended or adjusted under 35 U.S.C. 154(b) by 0 days.

(21) Appl. No.: 09/075,136

(22) Filed: May 8, 1998

(51) Int. Cl.⁷ .............................................. G06F 17/60
(52) U.S. Cl. ................. 705/38; 705/1; 705/35
(58) Field of Search ................. 705/38, 1, 35

(56) References Cited

U.S. PATENT DOCUMENTS

| | | | |
|---|---|---|---|
| 4,346,442 A | | 8/1982 | Musmanno |
| 5,535,407 A | | 7/1996 | Yanagawa et al. |
| 5,701,451 A | | 12/1997 | Rogers et al. |
| 5,706,434 A | | 1/1998 | Kremen et al. |
| 5,708,825 A | | 1/1998 | Sotomayor |
| 5,754,850 A | * | 5/1998 | Janssen .................... 707/104 |
| 5,794,207 A | | 8/1998 | Walker et al. |
| 5,797,133 A | * | 8/1998 | Jones et al. .................. 705/38 |
| 5,845,265 A | | 12/1998 | Woolston |
| 5,870,721 A | * | 2/1999 | Norris ........................ 705/38 |
| 5,878,403 A | * | 3/1999 | DeFrancesco et al. ........ 705/38 |
| 5,907,828 A | * | 5/1999 | Meyer et al. ................. 705/4 |
| 5,924,082 A | * | 7/1999 | Silverman et al. ........... 705/37 |
| 5,930,776 A | * | 7/1999 | Dykstra et al. .............. 705/38 |
| 5,940,812 A | * | 8/1999 | Tengel et al. ................ 705/38 |
| 5,966,699 A | * | 10/1999 | Zandi ........................ 705/38 |
| 5,995,947 A | | 11/1999 | Fraser et al. ................ 705/38 |
| 6,014,645 A | | 1/2000 | Cunningham ................ 705/38 |
| 6,029,149 A | * | 2/2000 | Dykstra et al. .............. 705/38 |
| 6,049,784 A | * | 4/2000 | Weatherly et al. ............ 705/38 |
| 6,064,986 A | * | 5/2000 | Edelman .................... 705/36 |

FOREIGN PATENT DOCUMENTS

| | | | | |
|---|---|---|---|---|
| WO | WO 99/59084 | * | 11/1999 | ........... G06F/17/30 |

OTHER PUBLICATIONS

"IMX® Exhcange: The 'Stock Market' of The Mortgage Industry"; http://www3.imxexchange.com/about/press/00_01_25.html; Jan. 25, 2000.

* cited by examiner

Primary Examiner—Tariq R. Hafiz
Assistant Examiner—Akiba Robinson-Boyce
(74) Attorney, Agent, or Firm—King & Spalding

(57) ABSTRACT

The invention relates to a method and a computer for coordinating an electronic credit qualification form between an Internet user and a plurality of lending institutions via the Internet. This method involves displaying documents in a web site, and receiving credit data forming placed on the web site. After receiving this data a special loan processing computer applies a filter to the data. The filter comprises loan selection criteria provided by lending institutions which allows these institutions to filter out loan applications that they do not want. Next, after the data is filtered, it is transmitted to a plurality of lending institutions. Finally, the computer and the method then controls and coordinates communication between these lending institutions and the Internet user to match borrowers and lenders via the Internet.

36 Claims, 10 Drawing Sheets

METHOD AND COMPUTER NETWORK FOR CO-ORDINATING A LOAN OVER THE INTERNET

BACKGROUND OF THE INVENTION

1. The Field of the Invention

The invention relates to a process for coordinating loans on a loan processing computer over the Internet. The Internet, a vast collection of computers world wide, is a relatively new medium for both personal and commercial entities to transact business. To conduct business over the Internet, companies must find ways to communicate with potential customers. The two most common forms of communication across the Internet are web pages, and e-mail.

2. The Prior Art

Various methods are known for presenting web pages over the Internet. For example, information about the Internet and web browsers can be found in U.S. Pat. No. 5,701,451 to Rogers et al., which is incorporated herein by reference. Rogers et al., details how requests of a web browser are processed. The Rogers invention speeds up the process for receiving requests from web browser users and retrieving the required information. U.S. Pat. No. 5,535,407 to Yanagawa et al., details a customer data processing system which is used to assist credit card purchases made in stores. The Yanagawa invention simplifies the way in which credit card purchases are verified at the time of checkout. U.S. Pat. No. 4,346,442 to Musmanno details a securities brokerage-cash management system. The Musmanno invention maintains customer brokerage accounts, charge cards and checking accounts and calculates available credit for purchases of securities.

Until now, there has been no way to apply for credit from a multitude of lending institutions without physically going to or calling each lender and filling out an application or credit qualification form. This process was tedious and time consuming. All applications required substantially the same information: name, address, occupation, debt, amount of loan, etc.. This invention combines the vast resources and speed of the Internet with additional knowledge of various lending institution's selection criteria to create a simple mechanism whereby an Internet user can apply for credit from a multitude of lending institutions.

SUMMARY OF THE INVENTION

To overcome these limitations, it is therefore an object of the present invention to provide a fast, convenient process to apply for credit from a large number of lending institutions. In accordance with our invention, needless repetitive applications or credit qualification form are eliminated.

It is a further object of the present invention to provide a universal credit qualification form over the Internet and to allow the Internet user to submit a single credit application to a plurality of lending institutions who then make offers to the customer via the Internet.

To achieve these and other objects of the invention, there is provided a method and apparatus for coordinating an electronic credit application between an Internet user and a plurality of lending institutions via the Internet. The method comprises the steps of displaying a plurality of documents to an Internet user, receiving a plurality of credit data sent from the Internet user; matching an electronic credit application to a filter comprising a plurality of selection criteria; transmitting the credit data to a plurality of lending institutions via one of four methods; and responding to the Internet user via the Internet. The documents sent to the Internet user includes a series of questions pertaining to their desired loan, followed by the appropriate type of loan application. The various types of loan applications include first and second mortgages, car loans, student loans, personal loans, and credit card applications. Other types of credit applications may exist without departing from the spirit of the invention. Upon completion of the application, the invention matches a unique filter to the credit data entered by the Internet user.

The filter is made up of a plurality of selection criteria in which a specific lending institution has given to the inventor. The filter is customizable by the specific lending institution in real time and unique to each lending institution. Once the application has been filtered, it is sent to a list of lending institutions that match with the credit application. These lending institutions then reply as to whether the application has been accepted or rejected.

The information can be sent in many different ways. For example, the information can be sent in an Active File Transfer system (AFTS), via e-mail, through a secured webpage or through a Common Gateway Interface (CGI). In addition, since much of the information relayed between the network of computers is private information, it is encrypted before it is sent from one computer to another.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENTS

Figure 1:
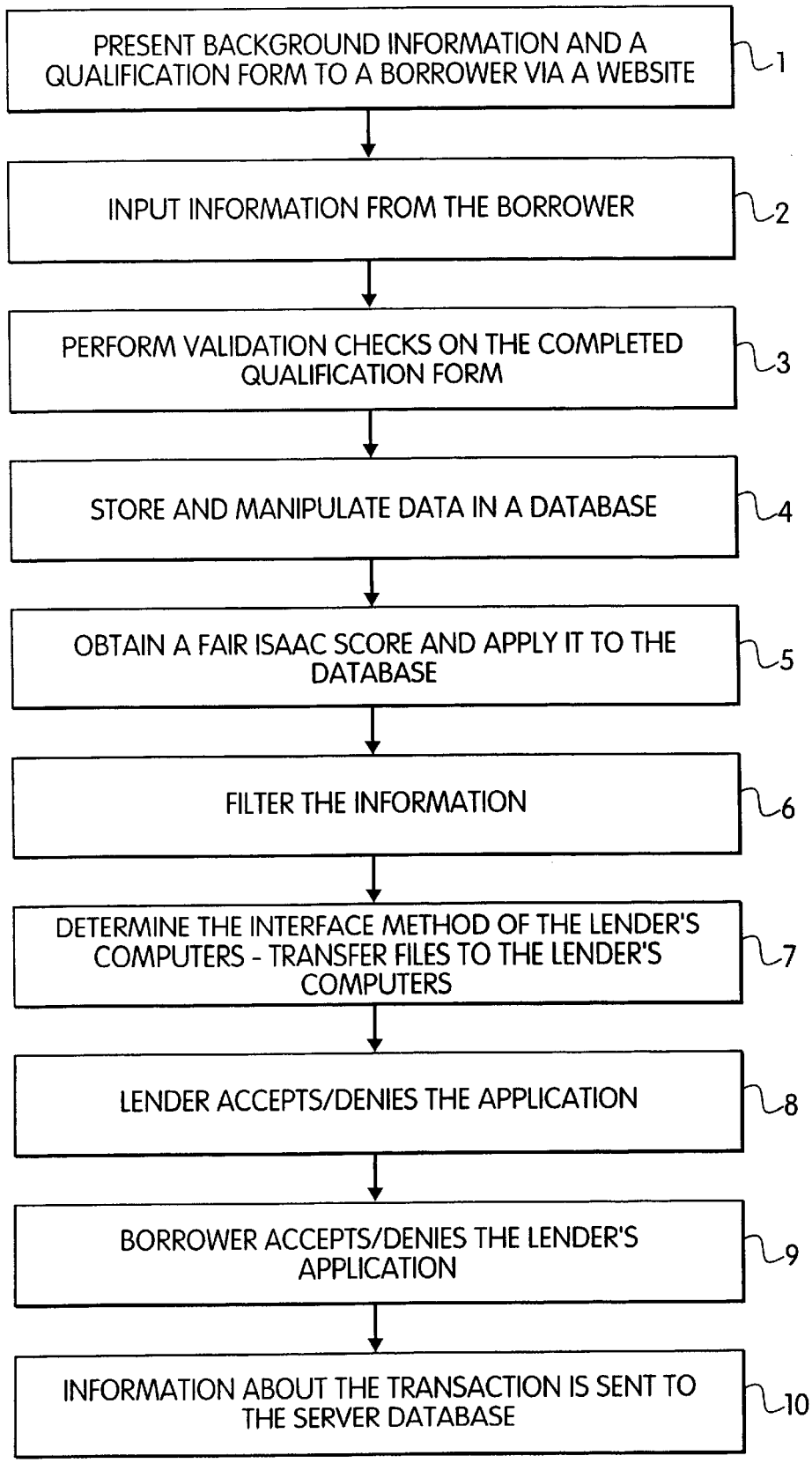
FIG. 1 shows an overview of the method of the invention.

Essentially, the invention is a process and a computer for coordinating loans between lending institutions and borrowers via the Internet. FIG. 1 illustrates the ten general stages in the process required to coordinate an electronic credit application between a prospective borrower and a plurality of lending institutions. For example, in stage 1 the process presents background information and a credit application to a prospective borrower-Internet user on a web site. In stage 2, the prospective borrower inputs information onto the web site. In stage 3, validation checks are performed on this information to make sure that the application is complete and correct. Next, stage 4 involves storing and manipulating the credit application in a database. In stage 5, a Fair Isaac Credit Score is obtained based upon the credit application and that score is matched to the application and stored in the database. Next, in stage 6, the application is filtered where it is compared to a list of criteria presented by a series of lending institutions. If the application passes this list of criteria then in stage 7 the application is sent to each one of those institutions whose criteria match with the application. In stage 8 the lender processes the application and can either accept or deny it. If the lender accepts the application then in stage 9, the borrower can reply stating whether he accepts or denies the lender's application. Finally, in stage 10, information about this transaction is sent to a database to allow lending institutions to have access to their lending history.

Figure 2:
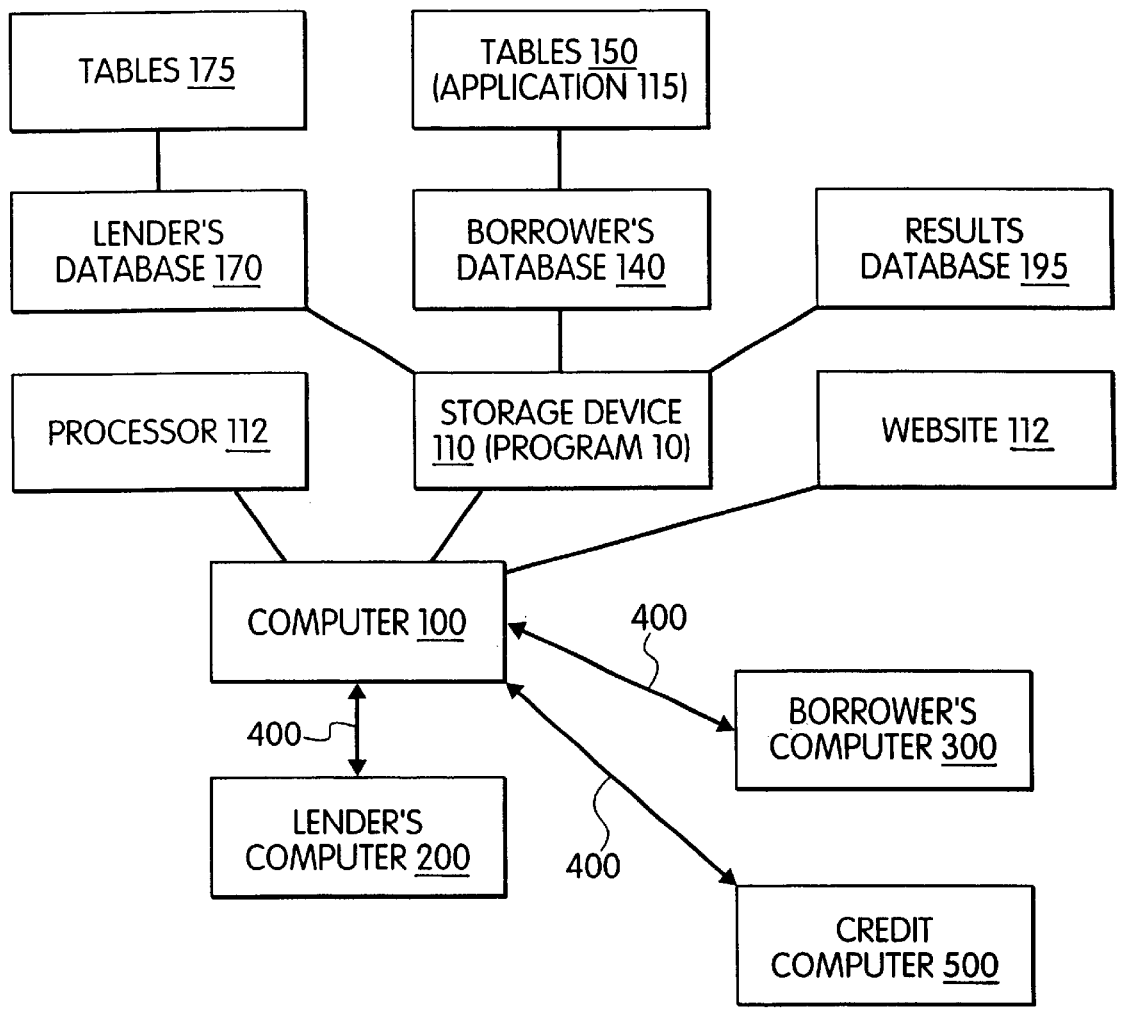
FIG. 2 shows a schematic depiction of network designed to achieve the method of the invention.

For this process to occur, there must be a series of computers connected to each other via telecommunication lines as shown in FIG. 2. Here, computer program 10, controls the process and is housed on loan processing computer 100. Loan processing computer 100 coordinates a loan application between a series of lending institution computers 200, and a plurality of borrower computers 300. Computer program 10 is stored on loan processing computer 100 in storage device 110 and is run by processor 112. Program 10 is designed to transmit and receive information through the Internet via a web browser such as Netscape or Internet Explorer, installed on the computers.

Loan processing computer 100 must have sufficient memory and processor power to project program 10 over the Internet. Therefore, the recommended minimum requirements for processor 12 on computer 100 is an Intel Pentium 200 Mhz processor. The remaining standard components are 64 megabytes of ram, 2 gigabytes of disk space, an Internet connection, additional Ethernet connection, and Windows NT workstation operating system. Computer 100 is installed with one Ethernet interface directly on the Internet, and the other Ethernet interface is connected to a firewall storage device 110, to allow disposition of files on a designated server inside the corporate network. In addition computer 100 could be a Unix style server that interfaces with other Unix and non-Unix based computers on the Internet.

Figure 3A:
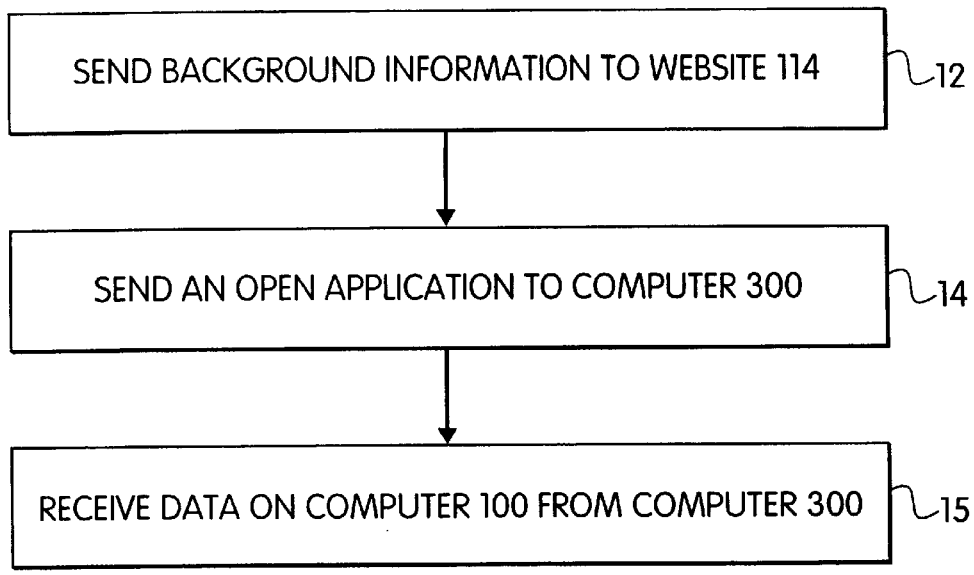
FIG. 3a shows the steps involving the second stage of the lending process.

When program 10 runs on computer 100 it instructs computer 100 to interact with other computers through the Internet to co-ordinate a loan application. For example, as shown in FIGS. 1 and 2, in stage 1, computer 100 allows lender computers 200 to access information on web-page 114 housed in loan processing computer 100 at a predetermined URL address via telecommunication lines 400. In stage 2, computer 100 allows prospective borrowers using satellite computers 300 to view a plurality of documents provided by computer 100. Stage 2 consists of a series of steps that are shown in FIG. 3a. For example, in step 12, computer 100 sends the prospective borrower background information documents to web-site 114 concerning the loan application. These background information documents include a document welcoming the Internet user to the web site, a document explaining the application process, and a document explaining the services provided. In step 14, computer 100 sends an open application to a prospective borrower through the Internet to computer 300. In step 15, the prospective borrower inputs information onto the application. When the prospective borrower wants to send this information back to computer 100 he clicks a "SEND" button which initiates the third stage of the program.

Figure 3B:
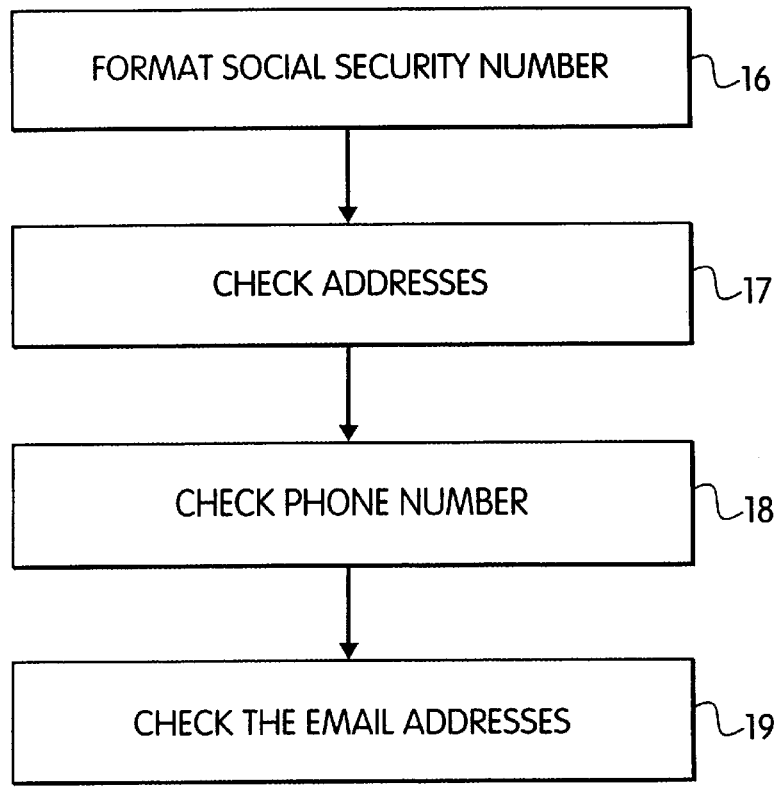
FIG. 3b shows the steps involving the third stage of the lending process.

FIG. 3b outlines stage 3 wherein computer 100 sends a series of instructions to computer 300 to initiate edit and validation checks. In step 16, computer 100 checks the Social Security number entered. In step 17 computer 100 checks the addresses, in step 18 it checks phone numbers, and in step 19 it checks the email addresses entered. The edit and validation checks in stage 3 insure that the data to be received by the database 140 in computer 100 is in the proper format for further processing. If computer 100 determines that the data is in the proper format, then the borrower can then transmit a completed application 115 to a database on computer 100.

Figure 4:
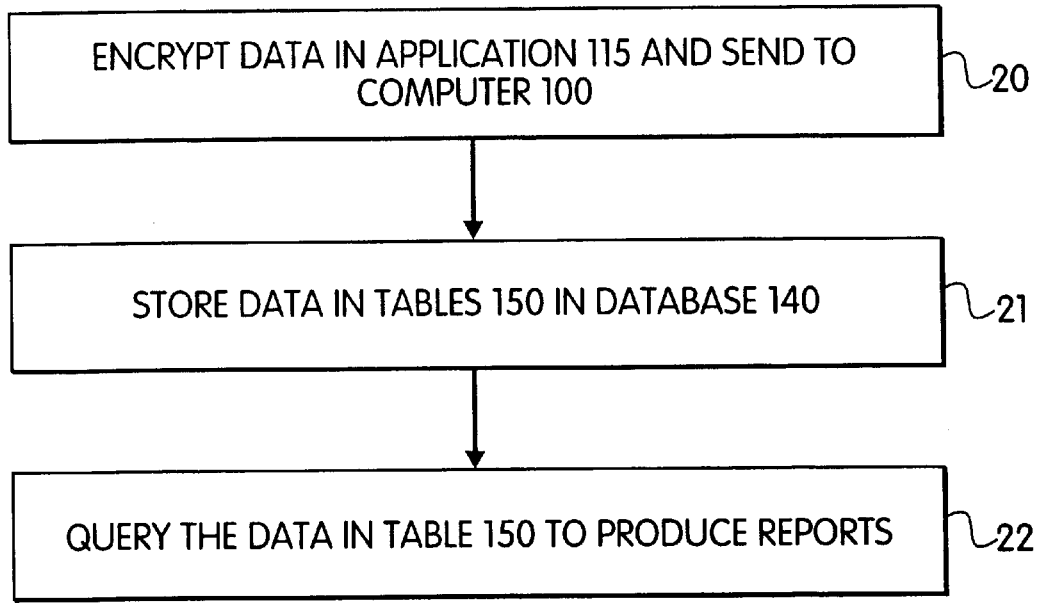
FIG. 4 shows the steps of the fourth stage of the lending process.

FIG. 4 shows stage 4, wherein in step 20 the data from the completed application 115 is encrypted by SSL technology. Next in step 21, at the borrowers instruction, this information is sent to computer 100, unlocked and stored in storage device 110 for further manipulation. In this stage, the data from completed application 115 is sorted and stored in tables 150 in database 140 based on the type of loan requested(i.e. mortgage, home equity, credit card, etc.). Next, in step 22, program 10 queries the data from tables 150 to produce reports providing loan information based on data given any field in the application form (i.e., state of residence, borrower income, etc.).

Figure 5:
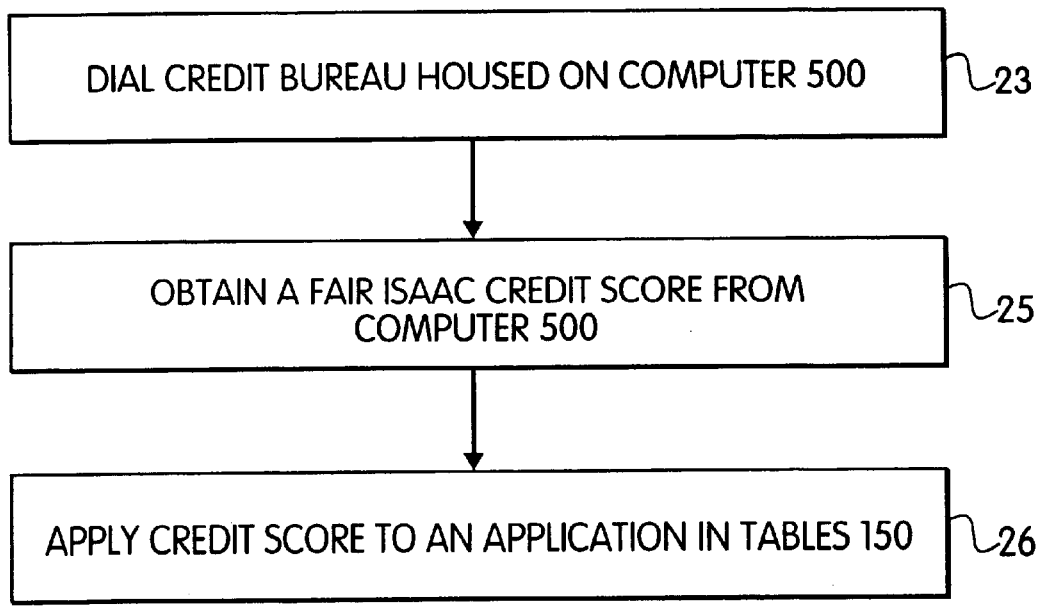
FIG. 5 shows the steps of the fifth stage of the lending process.

In FIG. 5, computer 100 moves into stage 5, wherein in step 23, computer 100 dials to a credit bureau housed on Credit Computer 500 via telecommunication lines 400. In step 25, computer 100 obtains a Fair Isaac Credit Score from computer 500 based upon the data sent to computer 500. Next, in step 26, computer 100 inputs the Fair Isaac Credit Score to the database tables 150. The lenders can use this Fair Isaac Credit Score as one determinant to the borrower's credit risk.

Figure 6:
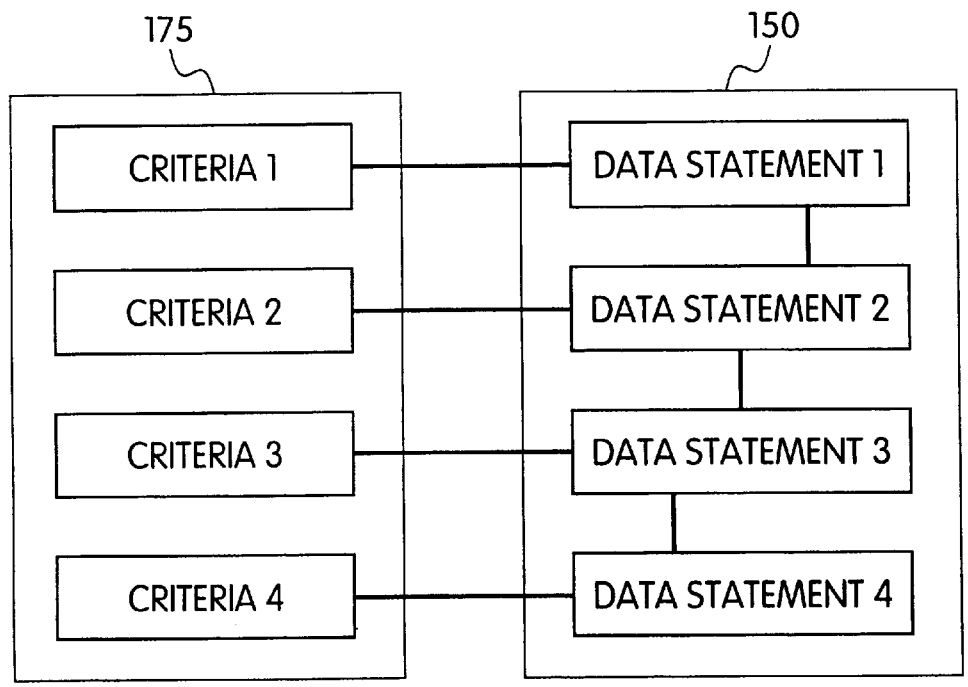
FIG. 6 shows a schematic of the filter process, matching an individual lender to an individual borrower.
Figure 7:
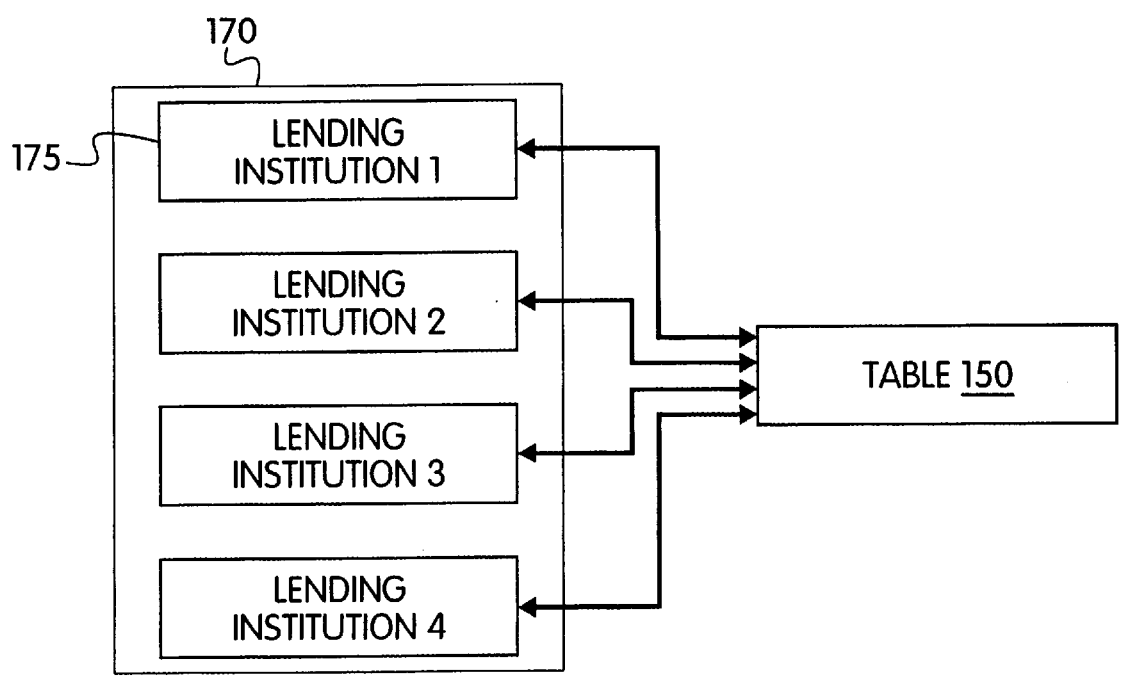
FIG. 7 shows the lending process where an individual lender selects from a plurality of borrowers.
Figure 8:
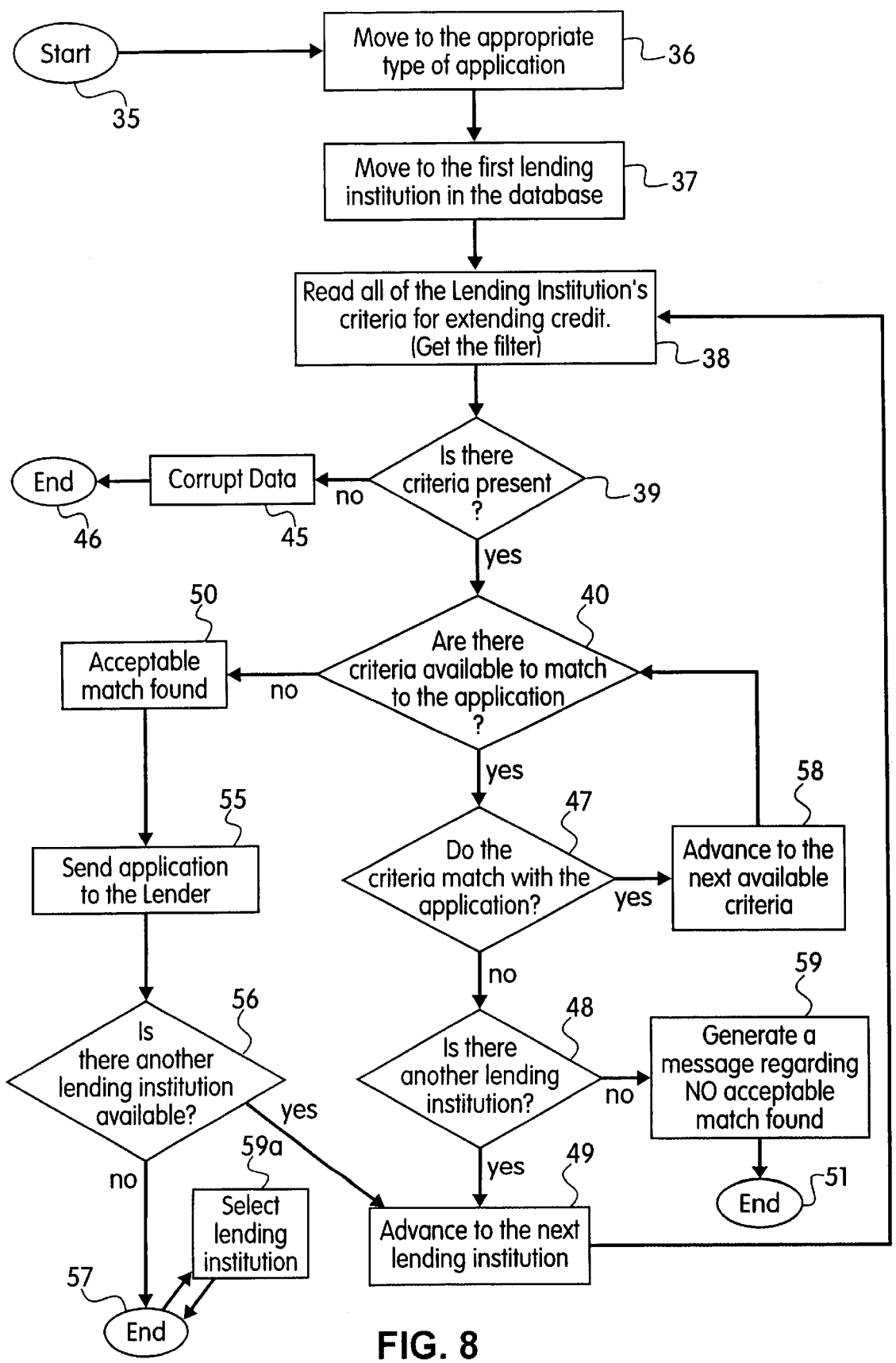
FIG. 8 shows the steps of the sixth stage of the lending process.

FIGS. 6, 7, and 8 show stage 6 of the process, wherein computer 100 runs a filter to match completed application 115 in table 150 against preset criteria established by each lender. As shown in FIG. 6, lender criteria are stored in tables 175 in lender database 170 on computer 100. Wherein in FIG. 7 lender database 170 includes a listing of tables 175 for several lending institutions. The process for matching borrower's application in tables 150 to lender criteria in tables 175 is shown in FIG. 8. For example, in step 35, program 10 starts the filter process. Next, in step 36, the filter process initiates and moves to the appropriate type application 115 in tables 150. Next, in step 37 the filter moves to a first lending institution in table 175. In step 38, program 10 instructs computer 100 to read all of the lending institution's criteria for extending credit. In step 39, program 10 reads whether there are any criteria present in tables 175. If the requested data is not present, next, in step 45 the filter checks to see if there is any database connection that is broken and whether the database information in the message. If the criteria are present, step 40 instructs computer 100 to see whether any remaining criteria to match to application 115 stored on tables 150.

If there are more criteria to match to application 115, then in step 47, program 10 checks to see whether that remaining criteria matches with application 115. If the criteria matches with application 115 then in step 58, program 10 advances to the next available criteria in tables 175. As shown in FIG. 6, step 58 creates a loop back to step 40. If the criteria does not match with application 115, then in step 48, program 10 checks to see whether there is another lending institution in database 170. If there are no remaining lending institutions in database 170 then in step 59, computer 100 generates a message that no acceptable match has been found. After this message, in step 51, the filter process ends.

If there is another lending institution found, then the filter process advances to another lending institution in step 49. Step 49 creates a loop back to step 38 wherein the filter process reads all of the criteria for the new lending institution. This loop continues until in step 40, the filter finds there are no criteria available to match to completed application 115.

If there are no more criteria to match to application 115, then in step 50, the filter determines whether there has been an acceptable match between a borrower and a lender. If there is an acceptable match, then in step 55 the filter selects that lender as a suitable lender for application 115.

In step 56 program 10 checks to see if there is another lending institution available, if yes, then program 10 advances to the next lending institution in step 49. If there are no more lending institutions available, then program 10 advances to step 57 wherein the filter process ends. Finally in step 59a computer 100 selects a limited number of matched lending institutions in which to send application 115. For example, if the filter process matches application 115 with 20 lending institutions, computer 100 may send application 115 to only a fraction of those matched lending institutions. This selection process in step 58 is based upon either random selection or a predetermined set of criteria stored in computer 100.

Figure 9A:
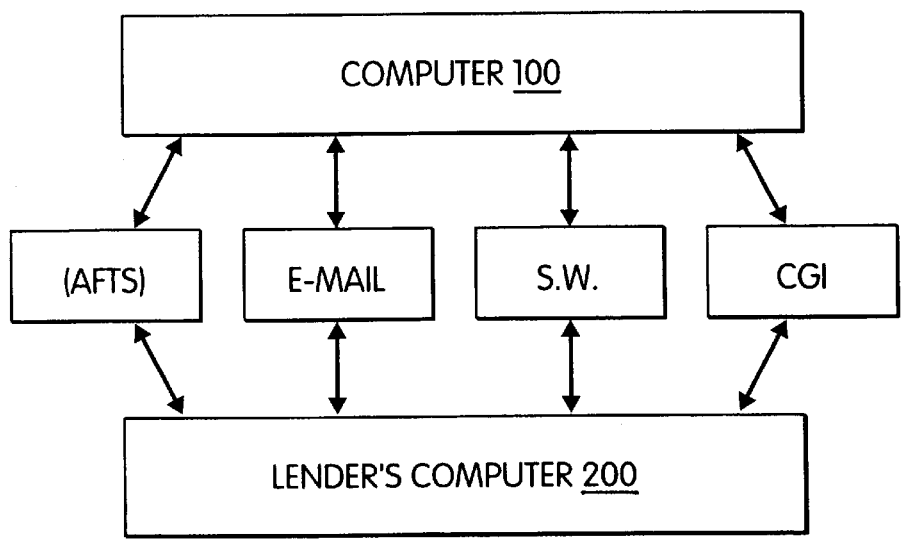
FIG. 9a shows a schematic of the seventh stage of the lending process.

Next, as shown in FIG. 9a in stage 7, program 10 determines the interface method between computer 100 and the selected lending institution computers 200. The interface method can be Common Gateway Interface (CGI), Active File Transfer (AFTS), as a secured file on a secured webpage (S.W.) or via e-mail. Stage 7 allows loan computer 100 to access many different lender sites which thereby allows for greater communication flexibility within the system.

Figure 9B:
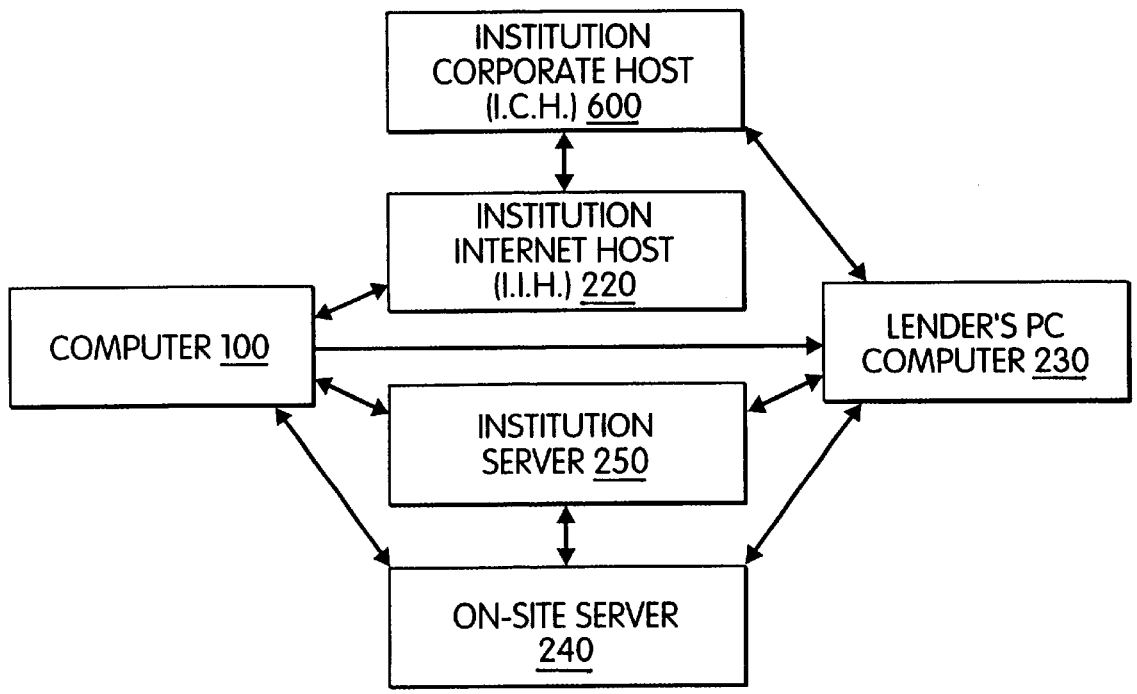
FIG. 9b shows the various transfer methods in the eighth stage of the lending process.
Figure 10:
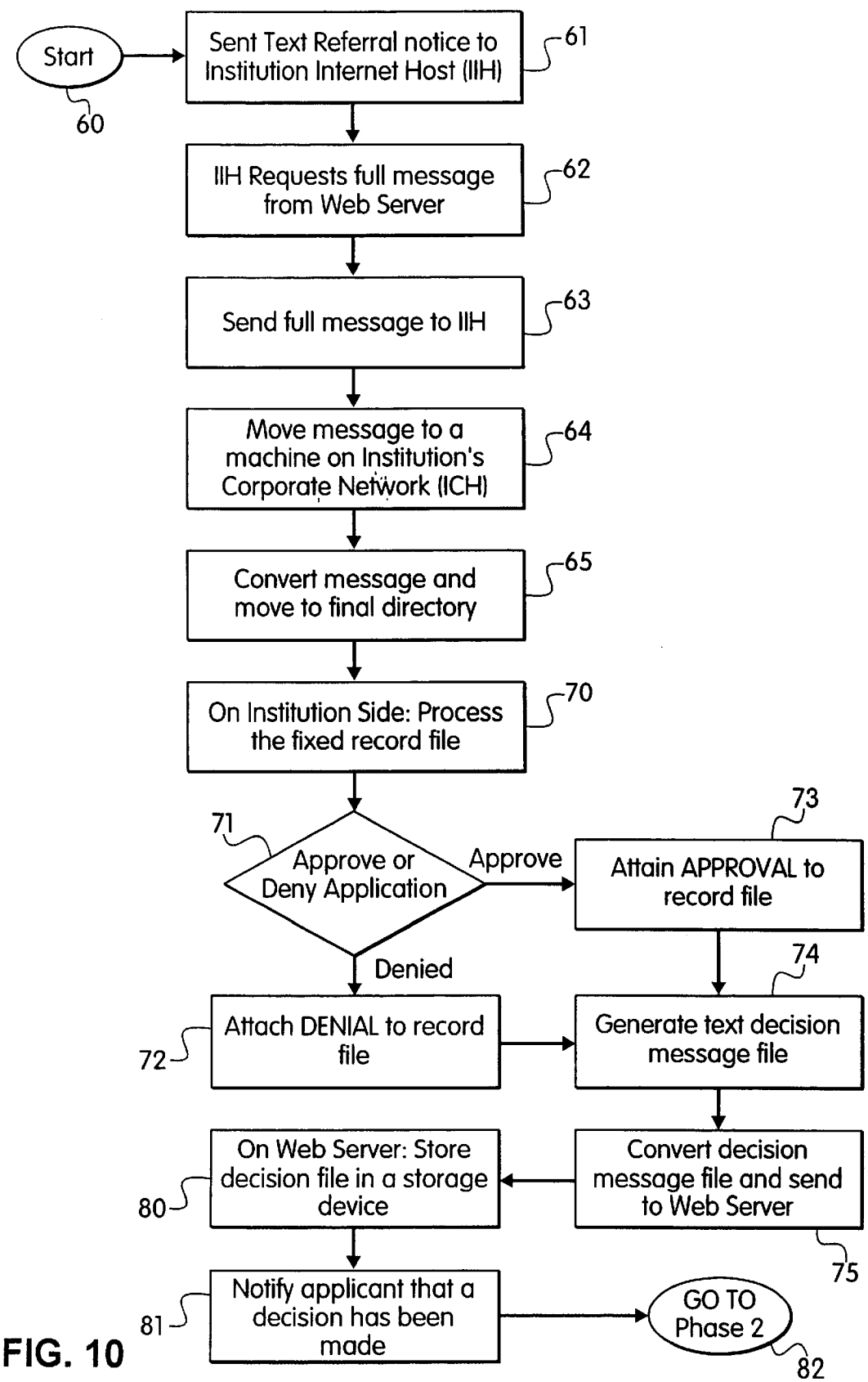
FIG. 10 shows the steps of the Active File Transfer System in the eighth stage in the of the lending process.

In stage 8, as shown in FIGS. 9a, 9b and 10, computer 100 sends data from table 150 via the interface method selected in stage 7 to the lending institutions selected in the filter process of stage 6. FIG. 10 shows the Active File Transfer System (AFTS) of FIG. 9b in greater detail. For example, in step 60, program 10 instructs computer 100 to start the AFTS. Next, in step 61 a text referral notice is sent to The Institution Internet Host (IIH) computer 220. In step 62, IIH computer 220 requests a full message from computer 100. In step 63 computer 100 sends an encrypted full message to IIH computer 220. Next, in step 64 computer 200 moves the message to the Institution's Corporate Network (ICH) 600. In step 65, ICH 600 converts the message from HTML format to a customized fixed record format defined and controlled by the destination institution. Next, in step 70, outside program 10, this information can be processed and stored in the lender's system. In step 71 the lender approves or denies application 115. If the lending institution approves application 115 it attaches an approval to the record file in step 73. Alternatively if the lending institution denies application 115, then in step 72 it attaches a denial to the record file. In step 74, the lender computers 700 generate a text decision message file. This message file is converted from the existing format into HTML format and sent to computer 100 web-site via encrypted transmission in step 75. The text decision message file contains a loan id number and a request for more information from the borrower. Computer 100 next stores the decision file in database 180 in step 80. Next, in step 81, computer 100 notifies an applicant that a decision has been made.

In addition, the data from credit application 115 can also be sent via e-mail with Pretty Good Privacy (PGP) encryption as shown in FIG. 9b. PGP is an encryption program that can be used to encrypt, a binary file to someone, with very high security, without having to exchange a set of private encryption keys beforehand. In this style transfer system, the text of table 150 comprising credit application 115, is transformed into an e-mail text message. Next, the e-mail message is encrypted in PGP format. Finally, computer 100 sends the e-mail message to computer 230 which is a remote networked computer on a lending institution's site.

The third transfer process, that of the secured dynamic website serves as a place for lenders to log in to a website to change their lending criteria filters and to view loan applications. In this process, information is stored on computer 100 in a website that can be accessed by a lender. To access this site, a lender is given a login access account to log into the website that is encrypted by SSL technology. Once the lender logs into the website he can download information relating to a borrower's request for information.

In the fourth transfer method, the Common Gateway Interface (CGI) format is shown in FIG. 9b. There, computer 100 sends data from table 150 to institution server 250 via a Common Gateway Interface (CGI) program. CGI programs allow for a server to server interface over which encrypted information can be transferred. For example, the data located on table 150 is first encrypted. Next the data can be sent from computer 100 to institution server 250. Server 250 next stores and unlocks the encrypted data. This unlocked data can then be read by all other networked computers 230 in a lender's home network.

Figure 11:
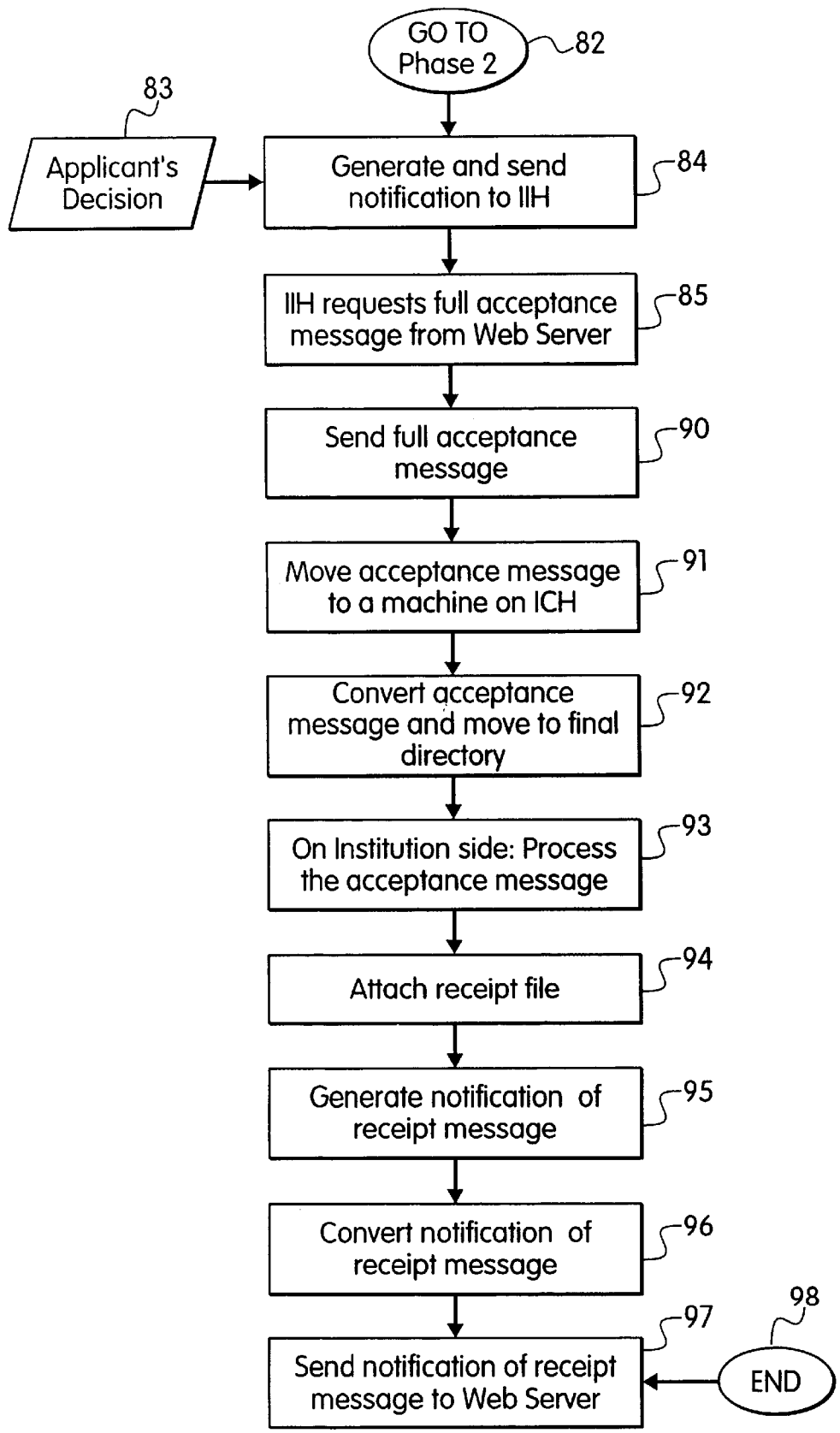
FIG. 11 shows the steps of the Active File Transfer System in the ninth stage of the lending process.

In stage 9, as shown in FIG. 11, computer program 10 moves into the second phase of (AFTS) in step 82. In this stage, the borrower informs the lender of his decision concerning the loan. For example, in step 83 a borrower sends his decision notification from computer 300 to computer 100. Next, in step 84, computer 100 generates and sends a notification to computer 220 (IIH). In step, 85 computer 100 sends a full acceptance message to IIH computer 220 and next moves the acceptance message to ICH computer 600 in step 90. After that, in step 91 ICH computer 600 converts the acceptance message from HTML format and moves it to a final directory 190 on computer 230 (step 91).

At this point the lending institution program takes over so that in step 93, institution computer 230 processes the acceptance message. In step 94, institution computer 230 attaches a receipt file to the acceptance message. In step 95, institution computer 230 generates a notification of receipt message, and in step 96, it converts the notification from its standard database format into HTML format. Finally, in step 97 ICH computer 600 sends a notification of the receipt message to computer 100 and in step 98 the Active File Transfer System ends.

Figure 12:
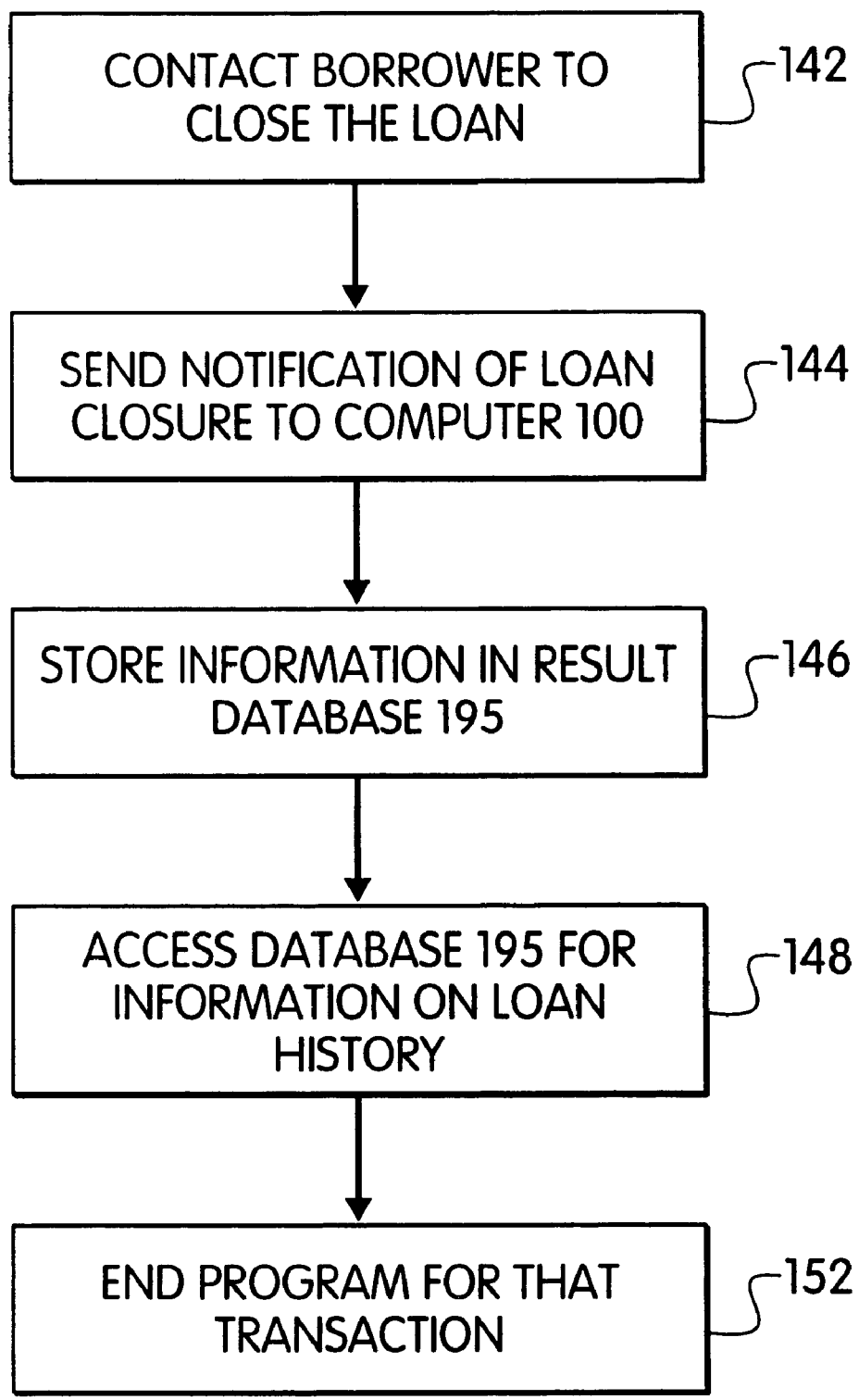
FIG. 12 shows the tenth stage of the lending process.

In the tenth and final stage, as shown in FIG. 12, in step 142 the lender contacts the borrower to coordinate the closing of the loan. Here, the lending institution has the borrower's name, social security number, application id number, phone number at both work and home, and the best time to contact the borrower from the acceptance email sent when the offer was accepted. The loan closing can take place in any way that the lender typically closes loans. Once all documents are signed and delivered from the borrower, the loan is closed. Once the lender closes a loan, in step 144 it contacts computer 100 and sends a notification of the loan closure. In step 146 computer 100 stores this information in result database 195 which can be accessed by the lenders in step 148. Finally in step 152, the process according to the invention ends for that individual transaction.

While several embodiments of the present invention have been shown and described, it is to be understood that many changes and modifications may be made thereunto without departing from the spirit and scope of the invention as defined in the appended claims.

What is claimed is:

1. A method for coordinating an electronic credit qualification form between an Internet user and a plurality of lending institutions via the Internet, comprising the steps of:

a) receiving selection criteria from the plurality of lending institutions;

b) storing the selection criteria in a database;

c) displaying a plurality of documents in a web site;

d) receiving a plurality of credit data sent from the Internet user;

e) applying said credit data to a filter comprising the plurality of selection criteria of the database to select without manual intervention each one of said plurality of lending institutions associated with a match of said credit data to said selection criteria;

f) determining an appropriate transfer method to transmit said electronic credit qualification form to the lending institutions associated with a match of said credit data;

g) transmitting said electronic qualification form comprising said credit data to said plurality of lending institutions associated with a match of said credit data via said appropriate transfer method, the transmission of said electronic qualification form comprising said credit data occurring without a delay for reception of any credit decisions from said lending institutions;

h) receiving a plurality of positive credit decisions from said plurality of lending institutions associated with a match of said credit data regarding an offer of credit or a loan to the Internet user;

i) simultaneously displaying the plurality of positive credit decisions to the Internet user on the web site;

j) receiving via the web site at least one decision from the Internet user regarding at least one of the positive credit decisions, the Internet user's decision comprising an acceptance, denial or request for more information regarding a positive decision for one of said lending institutions associated with a match of said credit data; and k) transmitting the at least one Internet user's decision to at least one lending institution corresponding with a positive credit decision so that said Internet user can obtain credit or a loan from one of said lending institutions associated with a match of said credit data, whereby said lending institutions associated with a match of said credit data compete with each other for business with the Internet user.

2. The method as claimed in claim 1, wherein step (c) comprises the steps of:

displaying a document welcoming the Internet user;

displaying a document explaining the electronic credit qualification form process;

displaying a document explaining the services provided; and displaying said electronic credit qualification form.

3. The method as claimed in claim 1, wherein step (d) further comprises the steps of:

verifying data input in a credit qualification form on a web site; and storing said plurality of credit data in a database table in a storage device.

4. The method as claimed in claim 3, wherein step (e) further comprises the steps of:

obtaining a Fair Isaac Credit Score based upon said plurality of credit data submitted; and attaching the Fair Isaac Credit Score to said database table.

5. The method as claimed in claim 4, further comprising the steps of:

reading the credit data of said database table from said storage device;

reading the selection criteria of said filter from said database, said selection criteria comprising lending institution criteria defined by each of the lending institutions and useful for identification of a qualified candidate for credit or a loan;

comparing said selection criteria of said filter to said credit data of said database table; and identifying a match between said filter and said database table wherein said match yields a qualification form selection of at least one of said plurality of lending institutions that will determine whether to respond to the electronic credit application by making a loan or credit offer to the Internet user.

6. The method as claimed in claim 1, wherein each lending institution is assigned a corresponding filter, said filter comprising selection criteria customizable by the lending institution.

7. The method as claimed in claim 1, wherein step (e) further comprises the steps of:

advancing to the first of said selection criteria of said filter;

comparing said selection criteria to the corresponding credit data on said electronic credit qualification form;

proceeding to the next level of said selection criteria if the comparison is successful; and proceeding to the next level of said filter if the comparison is unsuccessful.

8. The method as claimed in claim 1, further comprising:

transmitting said electronic credit qualification form to said lending institutions associated with a match of said credit data via a Common Gateway Interface (CGI).

9. The method as claimed in claim 1, further comprising:

transmitting said electronic credit qualification form to said lending institutions associated with a match of said credit data via a secured website.

10. The method as claimed in claim 1, further comprising:

transmitting said credit qualification form to said lending institutions associated with a match of said credit data via a secured E-Mail.

11. The method as claimed in claim 1, further comprising the step of:

receiving a notification of a successful transmission of said electronic credit qualification form from said plurality of lending institutions associated with a match of said credit data.

12. The method as claimed in claim 1, wherein the step of transmitting the Internet's user decision further comprises the step of collecting said Internet user's decision and storing said decision in a storage device.

13. The method as claimed in claim 1, further comprising the steps of:
receiving a notification of a closure of said electronic credit qualification form from one of the lending institutions associated with a match of said credit data.

14. The method as claimed in claim 1, further comprising the steps of:
generating a plurality of reports comprising said credit data for said plurality of lending institutions; and
displaying said plurality of reports to said plurality of lending institutions.

15. A network system for coordinating the submission of a loan qualification form by a borrower to a plurality of lenders, comprising:
a database for storing and receiving lender criteria data from the plurality of lenders;
means for inputting loan qualification form data from a prospective borrower into the network system;
means for inputting lender criteria data into the network system, the lender criteria data associated with each of the lenders and useful for selecting a successful loan qualification form;
computing means for comparing said borrower qualification form data to said lender criteria data of said database, the computing means operative to identify a plurality of lenders associated with a match of the qualification form data to the lender criteria data as a possible candidate for offering credit or a loan to the borrower; and
communicating means, connecting said means for inputting borrower qualification form data and said means for inputting lender criteria data to said computing means, for allowing said connected components to communicate with each other;
said computing means further operative to transmit said borrower qualification form data to a selected number that is less than said identified lenders or a random number of said identified lenders via said communicating means, said selected number comprising two or more identified lenders when a plurality of lenders exists, said computing means also operative to transmit said borrower qualification form data to said selected number of said identified lenders without a delay for reception of any credit decisions received from said lending institutions associated with a match of said credit data; said computing means also operative to receiving and simultaneously displaying a plurality of credit decisions on a web site from said identified lenders that received the credit data regarding an offer of credit or a loan to the borrower, said computing means further operative to determine an appropriate transfer method to transmit said electronic credit qualification form data to lenders associated with a match of said credit data; said computing means further operative receive from the web site at least one borrower's decision and to transmit the at least one borrower's decision to at least one lender corresponding with a positive credit decision, the borrower's decision comprising an acceptance, denial or request for more information regarding a positive credit decision for one of said lending institutions associated with a match of said credit data,
whereby said selected number of said identified lenders competes with each other for business with said borrower.

16. The network system as claimed in claim 15, wherein said database is connected to said computing means, for storing said borrower qualification form data and said lender criteria data.

17. The network system as claimed in claim 15, wherein said communicating means comprises the Internet.

18. The network system as claimed in claim 17, wherein said means for inputting borrower qualification form data comprises a computer connected to the Internet.

19. The network system as claimed in claim 17, wherein said means for inputting lender criteria data comprises a computer connected to the Internet.

20. The network system as claimed in claim 17, wherein said computing means comprises an Internet server connected to remote computers on the Internet.

21. A computer-implemented method for coordinating submission of an electronic credit qualification form between a consumer and a plurality of lending institutions via a distributed computer network, comprising the steps of:
receiving selection criteria from the plurality of lending institutions;
storing the selection criteria in a database;
receiving credit data for the electronic credit qualification form from the consumer via the distributed computer network;
comparing the credit data to the selection criteria of the database, the selection criteria being useful for selecting a successful credit qualification form and corresponding to each of the plurality of lending institutions;
in response to the credit data satisfying the selection criteria, identifying each lending institution associated with a match of the credit data to the selection criteria as a possible candidate for offering credit or a loan to the consumer;
determining an appropriate transfer method to forward the credit data to the lending institutions associated with a match of said credit data;
forwarding the credit data to a selected number of matching lending institutions associated with a match of the credit data to the selection criteria via the determined appropriate transfer method, the forwarding of the credit data occurring without a delay for reception of any credit decisions from said lending institutions associated with a match of said credit data, said selected number of matching lending institutions being less than a total number of the identified matching lending institutions and being greater than one when a plurality of identified lending institutions exists;
receiving positive credit decisions from the identified lending institutions that received the credit data regarding an offer of credit or a loan to the consumer;
creating a dynamic personal web site accessible by the consumer via the distributed computer network;
publishing a decision of each identified lending institution that received the credit data on the dynamic personal web site;
receiving at least one decision via the dynamic personal web site from the consumer regarding at least one of the positive credit decisions, the consumer's decision comprising an acceptance, denial or request for more information regarding a positive credit decision for one of said lending institutions associated with a match of said credit data; and transmitting at least one consumer decision to at least one lending institution corresponding with a positive credit decision via the distributed computer network, whereby the selected number of lending institutions compete with each other for business with the consumer.

22. The method as claimed in claim 21, further comprising the step of providing the electronic credit qualification form to the identified lending institutions by transmitting the credit data to the identified lending institutions via the distributed computer network.

23. The method as claimed in claim 21, further comprising the steps of:

obtaining a Fair Isaac Credit Score based upon the credit data supplied by the consumer in response to completing the electronic credit qualification form; and supplementing the credit data with the Fair Isaac Credit Score.

24. The method as claimed in claim 21, wherein the comparing step comprises:

(a) obtaining the selection criteria for a selected one of the lending institutions;

(b) determining whether the credit data satisfies the selection criteria for the selected lending institution;

(c) if so, then identifying the selected lending institution as a candidate for offering credit or a loan to the consumer;

(d) otherwise, determining whether selection criteria is available for a remaining one of the lending institutions;

(e) continuing steps (a)–(d) for each one of the remaining ones of the lending institutions.

25. The network system of claim 20, wherein the computing means, responsive to the decision from the borrower, is operative to send the borrower's decision to each identified lending institution via the communicating means and to store the borrower's decision in a storage device coupled to the computing means.

26. A computer-readable medium having computer executable instructions for coordinating submission of an electronic credit qualification form between a consumer and a plurality of lending institutions, comprising:

receiving selection criteria from the plurality of lending institutions;

storing the selection criteria in a database;

receiving credit data for the electronic credit qualification form from the consumer;

comparing the credit data to the selection criteria of the database, the selection criteria useful for selecting a successful credit qualification form and defined by each of the lending institutions based on their particular lending criteria;

in response to the credit data satisfying the selection criteria, identifying each lending institution associated with a match of the credit data to the selection criteria as a possible candidate for offering credit or a loan to the consumer;

selecting a predetermined number of the matching lending institutions and forwarding the credit data to the selected set of the matching lending institutions, the forwarding of the credit data occurring without a delay for reception of any credit decisions from said lending institutions associated with a match of said credit data, said predetermined number being less than a total number of the matching lending institutions previously identified and being greater than one when a plurality of identified lending institutions exists;

receiving a plurality of positive credit decisions from the matching lending institutions of the selected set regarding an offer of credit or a loan to the consumer;

displaying information including each credit decision to the consumer advising that the selected set of the matching lending institutions represents possible candidates for offering credit or a loan to the consumer, thereby providing the consumer with the opportunity to accept the credit or loan offer from one of the selected set of identified lending institutions, such that the selected set of identified lending institutions competes for business with the consumer;

determining an appropriate transfer method to transmit the electronic credit qualification form to each selected one of the matching lending institutions;

sending the electronic credit qualification form to each selected one of the matching lending institutions via the appropriate transfer method;

accepting a consumer's decision via a web site regarding the offer of credit or a loan from the selected ones of the matching lending institutions, the consumer's decision comprising an acceptance, denial or request for more information regarding a positive credit decision for one of said lending institutions associated with a match of said credit data; and forwarding the consumer's decision to the selected ones of the matching lending institutions.

27. The computer-readable medium as claimed in claim 26, wherein the computer-executable instructions for completing the comparing step comprise:

(a) obtaining the selection criteria for a selected one of the lending institutions;

(b) determining whether the credit data satisfies the selection criteria for the selected lending institution;

(c) if so, then identifying the selected lending institution as a candidate for offering credit or a loan to the consumer;

(d) otherwise, determining whether selection criteria is available for a remaining one of the lending institutions;

(e) continuing steps (a)–(d) for each one of the remaining ones of the lending institutions.

28. The computer-readable medium as claimed in claim 26, further comprising computer-executable instructions for providing the electronic credit qualification form to only the selected set of the matching lending institutions by transmitting the credit data to the selected set of the matching lending institutions via a distributed computer network.

29. The computer-readable medium as claimed in claim 26, further comprising computer executable instructions for sorting the credit data, prior to the step of comparing the credit data, based on the type of loan or credit requested by the consumer.

30. The computer-readable medium as claimed in claim 26, wherein the computer executable instructions for forwarding the credit data comprise transmitting the credit data to a secured website accessible by the selected ones of the matching lending institutions, the credit data published at the secured website for review by only the selected ones of the matching lending institutions.

31. The computer-readable medium as claimed in claim 30, further comprising executable instructions for accepting at the secured website changes to the selection criteria for one of the selected matching lending institutions, thereby enabling the institution to customize its selection criteria on a real-time basis.

32. The computer-readable medium as claimed in claim 26, further comprising executable instructions for accepting a notice of a credit or loan closure in response to the consumer closing the credit or loan with one of the selected set of matching lending institutions.

33. A method for coordinating an electronic credit qualification form between an Internet user and a plurality of lending institutions via the Internet, comprising the steps of:

generating a first web site for receiving selection criteria from the plurality of lending institutions, the first website comprising a secured dynamic website;

obtaining selection criteria from the plurality of lending institutions with said first website;

storing the selection criteria in a database;

displaying an electronic qualification form in a second website;

obtaining credit data from the Internet user with the electronic qualification form;

applying said credit data to a filter comprising the plurality of selection criteria of the database to select without manual intervention each one of said plurality of lending institutions associated with a match of said credit data to said selection criteria;

determining an appropriate transfer method to forward said credit data to said lending institutions associated with a match of said credit data;

forwarding said credit data to a selected number of lending institutions associated with a match of said credit data, the selected number of lending institutions being less than a total number of identified matching lending institutions, and being greater than one when a plurality of identified lending institutions exists, the forwarding of said credit data occurring without a delay for reception of any credit decisions from said lending institutions and via the appropriate transfer method;

receiving a plurality of positive credit decisions from said plurality of lending institutions associated with a match of said credit data regarding an offer of credit or a loan to the Internet user;

displaying the plurality of positive credit decisions to the Internet user;

establishing communication between one or more of the selected number of lending institutions associated with a match of said credit data and the Internet user so that said Internet user can obtain credit or a loan from one of the selected lending institutions associated with a match of said credit data, whereby said lending institutions associated with a match of said credit data compete with each other for business with the Internet user;

receiving at least one decision via the second web site from the Internet user regarding at least one of the positive credit decisions, the Internet user's decision comprising an acceptance, denial or request for more information regarding a positive credit decision for one of said lending institutions associated with a match of said credit data; and transmitting the at least one Internet user's decision to at least one lending institution corresponding with a positive credit decision.

34. The method as claimed in claim 32, further comprising:

forwarding said credit data to said lending institutions associated with a match of said credit data via a Common Gateway Interface (CGI).

35. The method as claimed in claim 32, further comprising:

forwarding said credit data to said lending institutions associated with a match of said credit data via said first secured website.

36. The method as claimed in claim 32, further comprising:

forwarding said credit data to said lending institutions associated with a match of said credit data via a secured E-Mail.

* * * * *

UNITED STATES PATENT AND TRADEMARK OFFICE
CERTIFICATE OF CORRECTION

| | | |
|---|---|---|
| PATENT NO. | : 6,385,594 B1 | |
| APPLICATION NO. | : 09/075136 | |
| DATED | : May 7, 2002 | |
| INVENTOR(S) | : Lebda et al. | |

It is certified that error appears in the above-identified patent and that said Letters Patent is hereby corrected as shown below:

Title Page, Item (75) Inventors should read

-- Douglas Lebda, Charlotte, NC (US); Richard Stiegler, Weddington, NC (US); James F. Bennett, Jr., Wellesley, MA (US) --.

Signed and Sealed this
First Day of December, 2015

Michelle K. Lee
*Director of the United States Patent and Trademark Office*